United States Patent
Chen et al.

(10) Patent No.: US 10,290,884 B2
(45) Date of Patent: May 14, 2019

(54) FUEL CELL SYSTEM AND CONTROLLING METHOD THEREOF

(71) Applicant: GENERAL ELECTRIC COMPANY, Schenectady, NY (US)

(72) Inventors: Yao Chen, ShangHai (CN); Honggang Wang, Malta, NY (US); Yingneng Zhou, ShangHai (CN); Baoming Huang, ShangHai (CN); Ralph Teichmann, Malta, NY (US)

(73) Assignee: General Electric Company, Schenectady, NY (US)

( * ) Notice: Subject to any disclaimer, the term of this patent is extended or adjusted under 35 U.S.C. 154(b) by 406 days.

(21) Appl. No.: 15/160,032

(22) Filed: May 20, 2016

(65) Prior Publication Data

US 2016/0344048 A1    Nov. 24, 2016

(30) Foreign Application Priority Data

May 20, 2015    (CN) .......................... 2015 1 0258296

(51) Int. Cl.
*H01M 8/04*     (2016.01)
*H01M 8/04537*  (2016.01)
(Continued)

(52) U.S. Cl.
CPC ..... *H01M 8/04589* (2013.01); *H01M 8/0491* (2013.01); *H01M 8/04305* (2013.01);
(Continued)

(58) Field of Classification Search
CPC ........... H01M 8/04589; H01M 8/1007; H01M 8/04305; H01M 8/04604; H01M 8/04619;
(Continued)

(56) References Cited

U.S. PATENT DOCUMENTS 6,872,480 B2   3/2005 Keller et al.
7,192,667 B2   3/2007 Yang et al.
(Continued)

FOREIGN PATENT DOCUMENTS

CN   102237536 A    11/2011
EP   1473789 B1     8/2011
(Continued)

OTHER PUBLICATIONS

Lu N et al., "Dynamic Modeling in Solid-Oxide Fuel Cells Controller Design", Power Engineering Society General Meeting 2007. IEEE Xplore, pp. 1-7, Jun. 24-28, 2007, Conference Location: Tampa, FL.
(Continued)

*Primary Examiner* — Anthony R Jimenez
(74) *Attorney, Agent, or Firm* — Catherine J. Winter; GPO Global Patent Operation

(57) ABSTRACT

A fuel cell system is disclosed, which includes a fuel cell stack coupled to a load for providing power, a gas delivery system coupled to the fuel cell stack for providing fuel and oxygen to the fuel cell stack and a control system. The control system includes a forward controller for generating a desired control instruction signal based on a command from the load, and a correction controller for generating a control correction signal to avoid violating operational constraints of the fuel cell stack based on at least one measured signal from the fuel cell system. The control system generates a control signal based on the desired control instruction signal and the control correction signal, and controls the gas delivery system based on the generated control signal to ensure the fuel cell stack is operated within safe operating limits. A method for controlling the fuel cell system is also disclosed.

20 Claims, 4 Drawing Sheets

(51) Int. Cl.
*H01M 8/04746* (2016.01)
*H01M 8/1007* (2016.01)
*H01M 8/04298* (2016.01)
*H01M 8/04858* (2016.01)
*H01M 8/04992* (2016.01)
*H01M 8/124* (2016.01)

(52) U.S. Cl.
CPC ... *H01M 8/04604* (2013.01); *H01M 8/04619* (2013.01); *H01M 8/04753* (2013.01); *H01M 8/04992* (2013.01); *H01M 8/1007* (2016.02); *H01M 2008/1293* (2013.01)

(58) Field of Classification Search
CPC .......... H01M 8/04753; H01M 8/0491; H01M 8/04992; H01M 2008/1293
USPC ........................................... 429/431
See application file for complete search history.

(56) References Cited

U.S. PATENT DOCUMENTS

| | | | |
|---|---|---|---|
| 8,185,214 B2 | 5/2012 | Dutta et al. | |
| 8,617,753 B2 | 12/2013 | Fukuda | |
| 8,652,697 B2 | 2/2014 | Gottmann et al. | |
| 8,859,156 B2 | 10/2014 | Shigezumi et al. | |
| 2009/0253007 A1 | 10/2009 | Mergler | |
| 2010/0255397 A1 | 10/2010 | Ishikawa | |
| 2010/0291446 A1 | 11/2010 | Aso et al. | |
| 2011/0165487 A1 | 7/2011 | Mitsui et al. | |
| 2012/0021319 A1 | 1/2012 | Tsuchiya et al. | |
| 2012/0028158 A1 | 2/2012 | Ooe et al. | |
| 2013/0059215 A1 | 3/2013 | Kawahara et al. | |
| 2013/0084510 A1 | 4/2013 | Masui et al. | |
| 2013/0183599 A1 | 7/2013 | Otsuka et al. | |
| 2014/0120435 A1 | 5/2014 | Kimura et al. | |

FOREIGN PATENT DOCUMENTS

| | | |
|---|---|---|
| EP | 3 185 344 A1 | 6/2017 |
| JP | 2007012549 A | 1/2007 |

OTHER PUBLICATIONS

European Search Report and Opinion issued in connection with corresponding EP Application No. 16169768.5 on Oct. 7, 2016.
Office Action issued in connection with corresponding EP Application No. 16169768.5 dated Feb. 22, 2018.
First Office Action and Search issued in connection with corresponding CN Application No. 201510258296.1 dated Jun. 26, 2018.

FUEL CELL SYSTEM AND CONTROLLING METHOD THEREOF

BACKGROUND

This disclosure relates generally to the field of fuel cells, and more particularly to a fuel cell system and a method for controlling the fuel cell system.

Fuel cells are an electro-chemical device that make use of electro-chemical reaction between a fuel, such as hydrogen, and an oxidizer, such as oxygen contained in the surrounding air, to generate electrical power. The fuel cells are advantageous in low contamination, high efficiency and high power density. Thus, developments and researches are intensively devoted to the fuel cell field for exploitation of the utilization thereof. A variety of fuel cells are available, among which proton exchange membrane fuel cell (PEMFC) is the most prospective one due to the advantages of low operation temperature, fast activation and high power density with respect to unit weight and volume.

However, it is known that the fuel cell will deteriorate with time when operated over an extended period of time. The degradation of the fuel cell includes faulty electrical contacts, cracks in electrolyte plates, coating faults, material faults, leakage, increased internal resistance, flooding or drying in membrane and etc. Factors affecting the life of the fuel cell may include geometrical design, material design, process flow design and operating control design. How to reduce the degradation of the fuel cell and prolong the life of the fuel cell by operation control is still a challenge.

BRIEF DESCRIPTION

In one aspect of embodiments of the present invention, a fuel cell system is provided. The fuel cell system comprises a fuel cell stack coupled to a load for providing power, a gas delivery system coupled to the fuel cell stack for providing fuel and oxygen to the fuel cell stack, and a control system. The control system comprises a forward controller for generating a desired control instruction signal based on a command from the load, and a correction controller for generating a control correction signal to avoid violating operational constraints of the fuel cell stack based on at least one measured signal from the fuel cell system. The control system generates a control signal based on the desired control instruction signal and the control correction signal, and controls the gas delivery system based on the generated control signal so as to ensure the fuel cell stack is operated within safe operating limits.

In another aspect of embodiments of the present invention, a method for controlling a fuel cell system is provided. The method comprises: generating a desired control instruction signal based on a command from a load in a fuel cell system, wherein the fuel cell system comprises a fuel cell stack coupled to the load for providing power, and a gas delivery system coupled to the fuel cell stack for providing fuel and oxygen to the fuel cell stack; generating a control correction signal to avoid violating operational constraints of the fuel cell stack based on at least one measured signal from the fuel cell system; generating a control signal based on the desired control instruction signal and the control correction signal; and controlling the gas delivery system based on the generated control signal so as to ensure the fuel cell stack is operated within safe operating limits.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure will be described herein below with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items. Further, the phrase "based on" means "based at least in part on".

Figure 1:
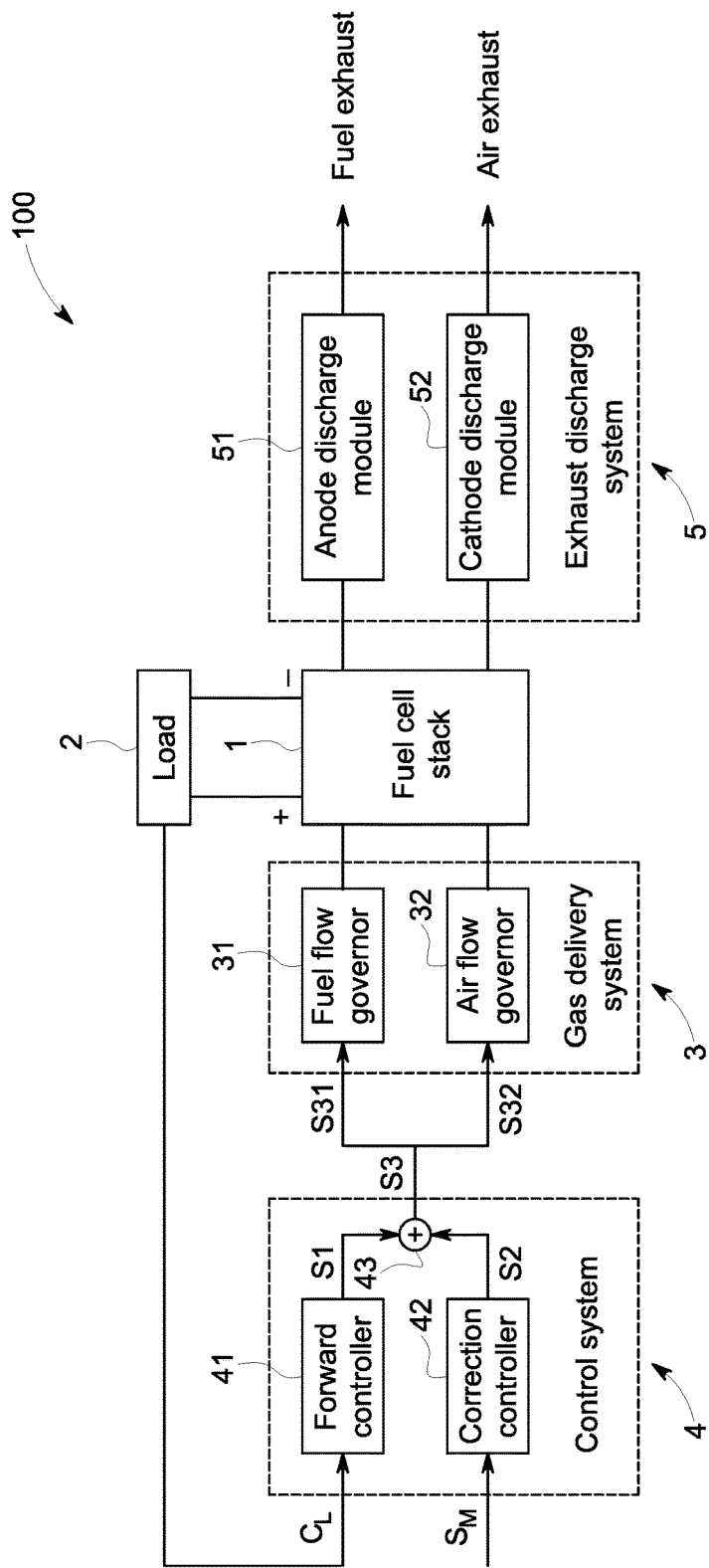
FIG. 1 is a schematic block diagram of a fuel cell system in accordance with an embodiment of the present invention.

FIG. 1 illustrates a schematic block diagram of a fuel cell system in accordance with an embodiment of the present invention. As shown in FIG. 1, a fuel cell system 100 in accordance with an embodiment of the present invention includes a fuel cell stack 1 coupled to a load 2 for providing power, a gas delivery system 3 coupled to the fuel cell stack 1 for providing fuel and oxygen to the fuel cell stack 1, and a control system 4 for controlling the gas delivery system 3. The control system 4 includes a forward controller 41 and a correction controller 42. The forward controller 41 is configured to generate a desired control instruction signal S1 based on a command $C_L$ from the load 2. The correction controller 42 is configured to generate a control correction signal S2 based on at least one measured signal $S_M$ from the fuel cell system 100. The control correction signal S2 is configured to avoid violating operational constraints of the fuel cell stack 1. The control system 4 is configured to generate a control signal S3 based on the desired control instruction signal S1 and the control correction signal S2, and control the gas delivery system 3 based on the generated control signal S3 so as to ensure the fuel cell stack 1 of the present invention is operated within safe operating limits.

The fuel cell system 100 of the present invention can address effectively different operational constraints of the fuel cell stack 1 in a uniform manner, and hold some key variables affecting the life of the fuel cell stack 1 in safe boundaries, so that the fuel cell system 100 of the present invention can effectively ensure that the fuel cell stack 1 is operated with its safe operating limits in condition of meeting normal operation of the fuel cell system 100. The fuel cell system 100 of the present invention can prolong the life of the fuel cell stack 1, and have simplified design and lower cost.

The fuel cell stack 1 includes a series of fuel cells stacked together. The fuel, usually hydrogen and the air, usually oxygen, are reacted in the fuel cell stack 1. The fuel cell stack 1 converts hydrogen and oxygen into water to produce electricity and heat. The fuel cell stack 1 of the present invention may be applicable for both high temperature fuel cells, such as a solid oxide fuel cell (SOFC), a molten carbonate fuel cell (MCFC) and etc., and low temperature fuel cells, such as a proton exchange membrane fuel cell (PEMFC), a direct methanol fuel cell (DMFC) and etc. For example, in the case that the fuel cell system of the present invention is a solid oxide fuel cell type system, the fuel cell stack comprises a series of solid oxide fuel cells. Each of the solid oxide fuel cells has an anode, a cathode, solid electrolyte between the anode and the cathode and an interconnect. The solid electrolyte is most commonly a ceramic material called yttria-stabilized zirconia (YSZ) that conducts negative oxygen ions at sufficient high temperature (typically above 500° C.).

The operational constraints of the fuel cell stack 1 are user specified operational constraints associated with the life of the fuel cell stack 1. The operational constraints of the fuel cell stack 1 may comprise at least one of the following constraints: a voltage of a single fuel cell of the fuel cell stack 1, a resistance of the fuel cell stack 1, a pressure difference between anode gas pressure and cathode gas pressure of the fuel cell stack 1, maximal temperature difference in the fuel cell stack 1, an oxygen excess ratio which is a ratio of the oxygen supplied to a cathode of the fuel cell stack 1 to the actually consumed oxygen, a fuel excess ratio which is a ratio of the fuel supplied to an anode of the fuel cell stack 1 to the actually consumed fuel, a pressure difference between ambient pressure where the fuel cell system 100 is located and anode inlet gas pressure of the fuel cell stack 1, a pressure difference between the ambient pressure and cathode inlet gas pressure of the fuel cell stack 1, cross leakage between the anode and the cathode, cross leakage between the anode and ambient environment where the fuel cell system 100 is located, and cross leakage between the cathode and the ambient environment. However, the operational constraints of the fuel cell stack 1 of the present invention should not be limited to the above constraints, and may also include other constraints which are not mentioned herein.

For example, in some embodiments, the voltage of the single fuel cell of the fuel cell stack 1 may be in the range of about 0.55 to 1.0V. The pressure difference between the anode gas pressure and the cathode gas pressure of the fuel cell stack 1 may be in the range of about −40 Kpa to 40 Kpa. The maximal temperature difference in the fuel cell stack 1 may be in the range of about −40 Kpa to 40 Kpa. The oxygen excess ratio may be in the range of 2 to 6. The fuel excess ratio may be in the range of 1.5 to 6. The pressure difference between ambient pressure and the anode inlet gas pressure of the fuel cell stack 1 may be in the range of about 0 Kpa to 40 Kpa. The pressure difference between the ambient pressure and the cathode inlet gas pressure of the fuel cell stack 1 may be in the range of 0 Kpa to 40 Kpa. But it should be understood that the number and the specific values of the operational constraints of the fuel cell stack 1 may be correspondingly adjusted in advance by the users according to practically operational conditions of the fuel cell stack 1.

The at least one measured signal $S_M$ may comprise at least one of the following signals: an anode inlet gas pressure, an anode outlet gas pressure, a cathode inlet gas pressure, a cathode outlet gas pressure, an anode inlet flow rate, an anode outlet flow rate, a cathode inlet flow rate, and a cathode outlet flow rate of the fuel cell stack 1, one and more temperature measurements of the fuel cell stack 1, a voltage of a single fuel cell of the fuel cell stack 1, a current of the fuel cell stack 1, and ambient temperature, ambient pressure, and ambient humidity where the fuel cell system 100 is located. However, the at least one measured signal $S_M$ of the present invention should not be limited to the above signals, and may also include other signals which are not mentioned herein.

Continuing to refer to FIG. 1, the fuel cell system 100 of the present invention further comprises an exhaust discharge system 5 coupled to the fuel cell stack 1 for discharging exhaust. The reactant and unreacted gas are discharged as the exhaust through the exhaust discharge system 5. The exhaust discharge system 5 includes an anode discharge module 51 for discharging fuel exhaust and a cathode discharge module 52 for discharging air exhaust.

With reference to FIG. 1, in an embodiment, the control system 4 further comprises a summator 43. The summator 43 is configured to sum the desired control instruction signal S1 and the control correction signal S2 to generate the control signal S3. However, the summator 43 is illustrated only as an example of the present invention, and in fact, the control system 4 of the present invention should not be limited to include the summator 43. In another embodiment of the present invention, the control system 4 may further comprise a selector. For example, the selector may be configured to select a maximum of the desired control instruction signal S1 and the control correction signal S2. The selected maximum is regarded as the control signal S3. Alternatively, the selector may be also configured to select a minimum of the desired control instruction signal S1 and the control correction signal S2. The selected minimum is regarded as the control signal S3.

The gas delivery system 3 includes a fuel flow governor 31 and an air flow governor 32. The fuel flow governor 31 is configured to adjust fuel flow rate which is supplied to the fuel cell stack 1. The air flow governor 32 is configured to adjust air flow rate which is supplied to the fuel cell stack 1.

Figure 2:
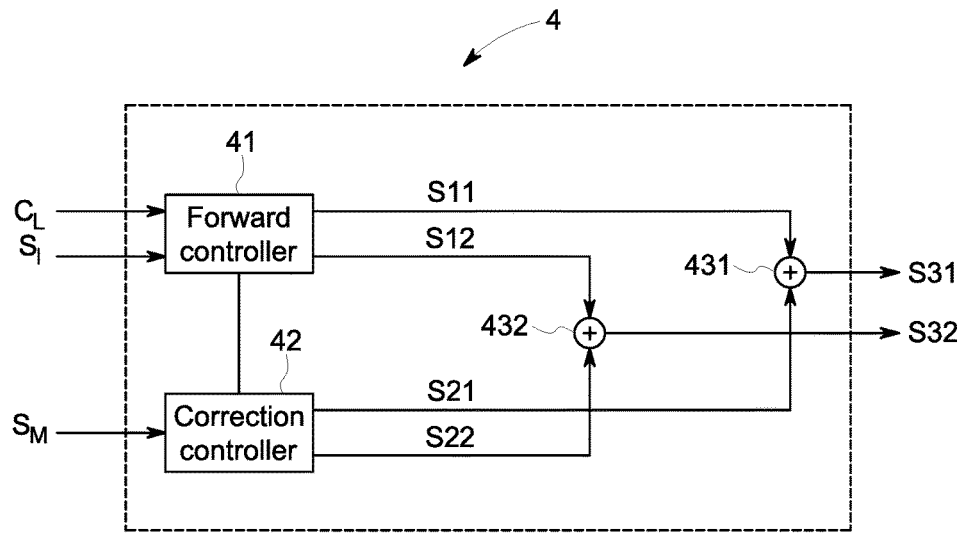
FIG. 2 is a schematic block diagram of a control system of FIG. 1.

FIG. 2 illustrates a schematic block diagram of the control system 4 of the present invention. As shown in FIG. 2, in an embodiment, the desired control instruction signal S1 comprises a desired fuel flow rate instruction signal S11 and a desired air flow rate instruction signal S12, and correspondingly, the control correction signal S2 comprises a fuel flow rate correction signal S21 and an air flow rate correction signal S22. The correction controller 42 generates the fuel flow rate correction signal S21 and adds the generated fuel flow rate correction signal S21 to the desired fuel flow rate instruction signal S11 so as to obtain the fuel flow rate signal S31, and the correction controller 42 generates the air flow rate correction signal S22 and adds the generated air flow rate correction signal S22 to the desired air flow rate instruction signal S12 so as to obtain the air flow rate signal S32. Thus, the control signal S3 comprises the fuel flow rate signal S31 and the air flow rate signal S32.

In this embodiment, with reference to FIG. 2, the summator 43 includes a first summator 431 and a second summator 432. The first summator 431 sums the desired fuel flow rate instruction signal S11 and the fuel flow rate correction signal S21 to generate the fuel flow rate signal S31. The second summator 432 sums the desired air flow rate instruction signal S12 and the air flow rate correction signal S22 to generate the air flow rate signal S32.

In one embodiment, the command $C_L$ from the load 2 comprises a power command $C_L$.

Figure 3:
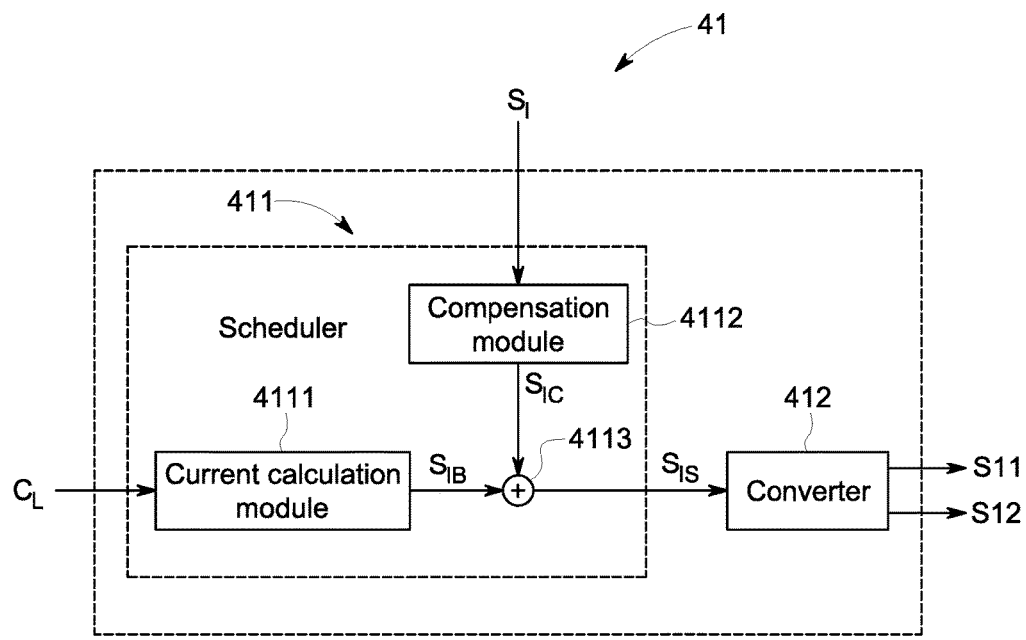
FIG. 3 is a schematic block diagram of a forward controller of FIG. 2.

FIG. 3 illustrates a schematic block diagram of the forward controller 41 of the present invention. As shown in FIG. 3, the forward controller 41 includes a scheduler 411 and a converter 412. In one embodiment, the scheduler 411 generates a scheduled current signal $S_{IS}$ based on the power command $C_L$. In another embodiment, the scheduler 411 generates the scheduled current signal $S_{IS}$ based on the power command $C_L$ and further based on a current measurement $S_I$ from the fuel cell stack 1. As an example, the scheduler 411 may include a current calculation module 4111, a compensation module 4112 and a third summator 4113. The current calculation module 4111 calculates a baseline current signal $S_{IB}$ based on the power command $C_L$ to meet the power command $C_L$. The compensation module 4112 generates a compensation current signal $S_{IC}$ based on the current measurement $S_I$. The third summator 4113 sums the baseline current signal $S_{IB}$ and the compensation current signal $S_{IC}$ to generate the scheduled current signal $S_{IS}$. The converter 412 converts the scheduled current signal $S_{IS}$ to the desired control instruction signal S1 by multiplying a stoichiometry ratio. In one embodiment, the desired control instruction signal S1 comprises the desired fuel flow rate instruction signal S11 and the desired air flow rate instruction signal S12.

With reference to FIGS. 1 and 2, the correction controller 42 of the present invention uses a model predictive control to address the operational constraints of the fuel cell stack 1. The correction controller 42 is configured to predict whether the desired control instruction signal S1 will violate the operational constraints of the fuel cell stack 1 based on the at least one measured signal $S_M$. When it is predicted that the desired control instruction signal S1 will violate the operational constraints of the fuel cell stack 1, the correction controller 42 of the present invention generates the control correction signal S2 and adds the generated control correction signal S2 to the desired control instruction signal S1. In one embodiment, the control correction signal S2 comprises the fuel flow rate correction signal S21 and the air flow rate correction signal S22. The fuel flow rate correction signal S21 is generated and added to the desired fuel flow rate instruction signal S11, and the air flow rate correction signal S22 is generated and added to the desired air flow rate instruction signal S12.

The fuel cell system 100 of the present invention may at least have beneficial technical effects as following:

The fuel cell system 100 of the present invention can provide a low cost solution for extending fuel cell life since there is no need for additional hardware, process flow or material change.

The fuel cell system 100 of the present invention can also provide a generic fuel cell life control solution which could deal with multiple, interactive constraints in one framework, and have the strong constraint handling capability which can deal with a fewer manipulated variables (for example, only two variables, fuel flow rate and air flow rate) to meeting the more constraints.

The fuel cell system 100 of the present invention can have a broader application field ranging from low temperature fuel cells to high temperature fuel cells.

The fuel cell system 100 of the present invention is easy to operate. The fuel cell system 100 of the present invention includes two separate controlling modules, that is, the forward controller 41 and the correction controller 42 which can be tuned and subjected to troubleshooting procedures separately, with a clear physical meaning. Thus, operators without a deep control background can also use the fuel cell system 100 of the present invention.

Figure 4:
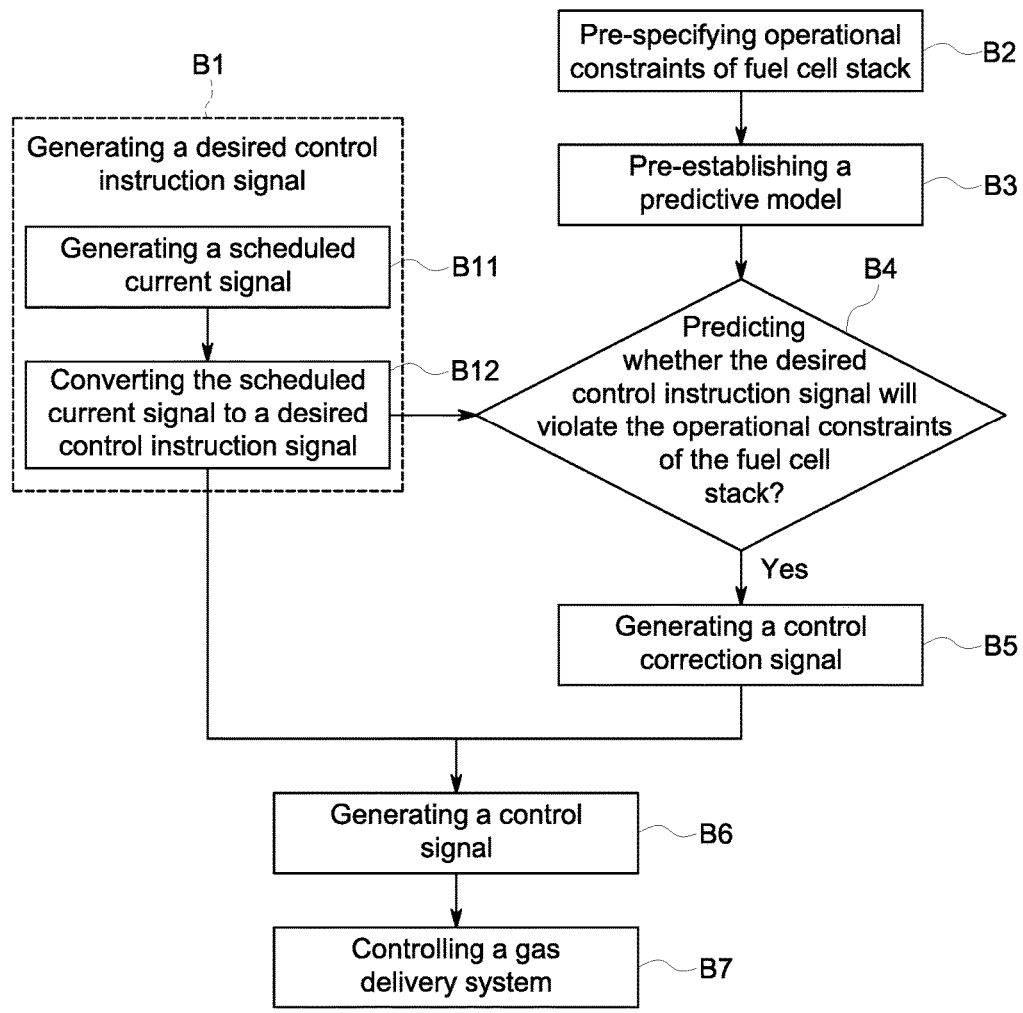
FIG. 4 is a flow chart of a method for controlling a fuel cell system in accordance with an embodiment of the present invention.

FIG. 4 illustrates a flow chart of a method for controlling the fuel cell system 100 in accordance with an embodiment of the present invention. As shown in FIG. 4 in conjunction with FIGS. 1-3, a method for controlling the fuel cell system 100 in accordance with an embodiment of the present invention includes the steps as following:

In block B1, a desired control instruction signal S1 is generated based on the command $C_L$ from the load 2 in the fuel cell system 100 above. In this embodiment, a desired fuel flow rate instruction signal S11 and a desired air flow rate instruction signal S12 are generated based on the command $C_L$ from the load 2. Thus, the desired control instruction signal S1 includes the desired fuel flow rate instruction signal S11 and the desired air flow rate instruction signal S12. In one embodiment, the command $C_L$ from the load 2 may comprise a power command $C_L$.

When the command $C_L$ from the load 2 is the power command $C_L$, the step B1 further comprises the steps as following:

In block B11, a scheduled current signal $S_{IS}$ is generated. In one embodiment, the scheduled current signal $S_{IS}$ is generated based on the power command $C_L$. In another embodiment, the scheduled current signal $S_{IS}$ is generated based on the power command $C_L$, and further based on a current measurement $S_I$ from the fuel cell stack 1.

Figure 5:
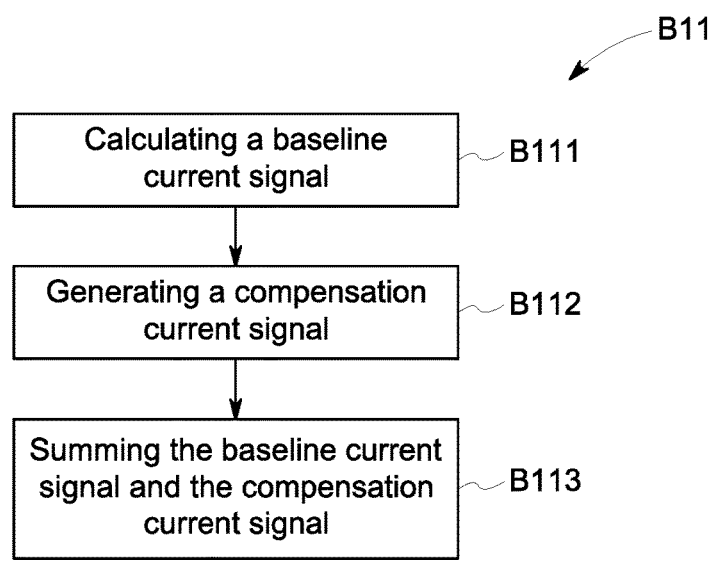
FIG. 5 is a flow chart illustrating the steps in generating a scheduled current signal according to the method of FIG. 4.

FIG. 5 is a flow chart illustrating the steps in generating the scheduled current signal $S_{IS}$ based on both the power command $C_L$ and the current measurement $S_I$ from the fuel cell stack 1 according to the method of FIG. 4. As shown in FIG. 5, the step B11 further comprises the following steps:

In block B111, a baseline current signal $S_{IB}$ is calculated based on the power command $C_L$ to meet the power command $C_L$.

In block B112, a compensation current signal $S_{IC}$ is generated based on the current measurement $S_I$.

In block B113, the baseline current signal $S_{IB}$ and the compensation current signal $S_{IC}$ are summed (added) to generate the scheduled current signal $S_{IS}$.

Returning now to FIG. 4, in block B12, the scheduled current signal $S_{IS}$ is converted to the desired control instruction signal S1 by multiplying a stoichiometry ratio. In this embodiment, the scheduled current signal $S_{IS}$ is converted to the desired fuel flow rate instruction signal S11 and the desired air flow rate instruction signal S12.

In block B2, the operational constraints of the fuel cell stack 1 are pre-specified by users. The operational constraints of the fuel cell stack 1 are associated with the life of the fuel cell stack 1. For example, the operational constraints of the fuel cell stack 1 may comprise but not be limited to be at least one of the following constraints: a voltage of a single fuel cell of the fuel cell stack 1, a resistance of the fuel cell stack 1, a pressure difference between anode gas pressure and cathode gas pressure of the fuel cell stack 1, maximal temperature difference in the fuel cell stack 1, an oxygen excess ratio which is a ratio of the oxygen supplied to a cathode of the fuel cell stack 1 to the actually consumed oxygen, a fuel excess ratio which is a ratio of the fuel supplied to an anode of the fuel cell stack 1 to the actually consumed fuel, a pressure difference between ambient pressure where the fuel cell system 100 is located and anode inlet gas pressure of the fuel cell stack 1, a pressure difference between the ambient pressure and cathode inlet gas pressure of the fuel cell stack 1, cross leakage between the anode and the cathode, cross leakage between the anode and ambient environment where the fuel cell system 100 is located, and cross leakage between the cathode and the ambient environment.

In block B3, a predictive model is pre-established. The predictive model is configured to describe the behavior of the fuel cell stack 1.

In block B4, it is predicted whether the desired control instruction signal S1 will violate the operational constraints of the fuel cell stack 1 from the predictive model based on the at least one measured signal $S_M$. In this embodiment, it is predicted whether any one or both of the desired fuel flow rate instruction signal S11 and the desired air flow rate instruction signal S12 will violate the operational constraints of the fuel cell stack 1 from the predictive model based on the at least one measured signal $S_M$. The at least one measured signal $S_M$ may for example, comprise but not be limited to, at least one of the following signals: an anode inlet gas pressure, an anode outlet gas pressure, a cathode inlet gas pressure, a cathode outlet gas pressure, an anode inlet flow rate, an anode outlet flow rate, a cathode inlet flow rate, and a cathode outlet flow rate of the fuel cell stack 1, one and more temperature measurements of the fuel cell stack 1, a voltage of a single fuel cell of the fuel cell stack 1, a current of the fuel cell stack 1, and ambient temperature, ambient pressure, and ambient humidity where the fuel cell system 100 is located. If the predicted result is "yes", the step goes to block B5.

In block B5, when it is predicted that the desired control instruction signal S1 will violate the operational constraints of the fuel cell stack 1, a control correction signal S2 is generated and added to the desired control instruction signal S1. In this embodiment, the control correction signal S2 includes a fuel flow rate correction signal S21 and an air flow rate correction signal S22.

For example, when it is predicted that the desired fuel flow rate instruction signal S11 of the desired control instruction signal S1 will violate the operational constraints of the fuel cell stack 1, the fuel flow rate correction signal S21 is generated and added to the desired fuel flow rate instruction signal S11. When it is predicted that the desired air flow rate instruction signal S12 of the desired control instruction signal S1 will violate the operational constraints of the fuel cell stack 1, the air flow rate correction signal S22 is generated and added to the desired air flow rate instruction signal S12. When it is predicted that both the desired fuel flow rate instruction signal S11 and the desired air flow rate instruction signal S12 of the desired control instruction signal S1 will violate the operational constraints of the fuel cell stack 1, the fuel flow rate correction signal S21 and the air flow rate correction signal S22 are respectively generated and added to the desired fuel flow rate instruction signal S11 and the desired air flow rate instruction signal S12.

In block B6, a control signal S3 is generated based on the desired control instruction signal S1 and the control correction signal S2. In this embodiment, the control signal S3 includes a fuel flow rate signal S31 and an air flow rate signal S32. Specifically, the fuel flow rate signal S31 is generated based on the desired fuel flow rate instruction signal S11 and the fuel flow rate correction signal S21, and the air flow rate signal S32 is generated based on the desired air flow rate instruction signal S12 and the air flow rate correction signal S22.

In one embodiment, the control signal S3 is generated by summing the desired control instruction signal S1 and the control correction signal S2. In detail, the fuel flow rate signal S31 of the control signal S3 is generated by summing the desired fuel flow rate instruction signal S11 and the fuel flow rate correction signal S21, and the air flow rate signal S32 of the control signal S3 is generated by summing the desired air flow rate instruction signal S12 and the air flow rate correction signal S22.

In block B7, the gas delivery system 3 is controlled based on the generated control signal S3 so as to ensure the fuel cell stack 1 is operated within safe operating limits. The generated control signal S3 includes the fuel flow rate signal S31 and the air flow rate signal S32, so the fuel flow rate signal S31 and the air flow rate signal S32 are configured to respectively control the fuel flow governor 31 and the air flow governor 32 (see FIG. 1) of the gas delivery system 3. The fuel flow governor 31 will adjust the fuel flow rate which is supplied to the fuel cell stack 1 according to the fuel flow rate signal S31, and the air flow governor 32 will adjust the air flow rate which is supplied to the fuel cell stack 1 according to the air flow rate signal S32.

The method for controlling the fuel cell system 100 of the present invention can address effectively different operational constraints of the fuel cell stack 1 in a uniform manner, and hold some key variables affecting the life of the fuel cell stack 1 in safe boundaries, so that the controlling method of the present invention can effectively ensure that the fuel cell stack 1 is operated with its safe operating limits in condition of meeting normal operation of the fuel cell system 100. The controlling method of the present invention can prolong the life of the fuel cell stack 1, simplify the design of the fuel cell system 100 and reduce the cost of the fuel cell system 100.

The method for controlling the fuel cell system 100 of the present invention has the similar beneficial technical effects to that described in the fuel cell system 100 above.

While the disclosure has been illustrated and described in typical embodiments, it is not intended to be limited to the details shown, since various modifications and substitutions can be made without departing from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A fuel cell system, comprising:
a fuel cell stack coupled to a load for providing power;
a gas delivery system coupled to the fuel cell stack for providing fuel and oxygen to the fuel cell stack; and
a control system comprising:
a forward controller for generating a control instruction signal based on a command from the load; and
a correction controller for generating a control correction signal based on at least one measured signal from the fuel cell system,
wherein the control system is configured to generate a control signal based on the control instruction signal and the control correction signal, and to control the gas delivery system based on the generated control signal so as to operate the fuel cell stack within specific operating limits; and
wherein the correction controller is configured to predict whether the control instruction signal will violate the operational constraints of the fuel cell stack based on the at least one measured signal, and generate the control correction signal and add the generated control correction signal to the control instruction signal when it is predicted that the control instruction signal will violate operational constraints of the fuel cell stack.

2. The fuel cell system of claim 1, wherein the correction controller uses a model predictive control to address the operational constraints of the fuel cell stack.

3. The fuel cell system of claim 1, wherein the at least one measured signal comprises at least one of the following signals: an anode inlet gas pressure, an anode outlet gas pressure, a cathode inlet gas pressure, a cathode outlet gas pressure, an anode inlet flow rate, an anode outlet flow rate, a cathode inlet flow rate, and a cathode outlet flow rate of the fuel cell stack, one and more temperature measurements of the fuel cell stack, a voltage of a single fuel cell of the fuel cell stack, a current of the fuel cell stack, and ambient temperature, ambient pressure, and ambient humidity where the fuel cell system is located.

4. The fuel cell system of claim 1, wherein the fuel cell system is a solid oxide fuel cell type system, and the fuel cell stack comprises a series of solid oxide fuel cells each of which has an anode, a cathode, solid electrolyte between the anode and the cathode and an interconnect.

5. The fuel cell system of claim 1, wherein the control system further comprises:
a summator for summing the control instruction signal and the control correction signal to generate the control signal.

6. The fuel cell system of claim 5, wherein the control instruction signal comprises a fuel flow rate instruction signal and an air flow rate instruction signal, the control correction signal comprises a fuel flow rate correction signal and an air flow rate correction signal, and the control signal comprises a fuel flow rate signal and an air flow rate signal, and wherein the summator comprises:
a first summator for summing the fuel flow rate instruction signal and the fuel flow rate correction signal to generate the fuel flow rate signal; and
a second summator for summing the air flow rate instruction signal and the air flow rate correction signal to generate the air flow rate signal.

7. The fuel cell system of claim 1, wherein the command from the load comprises a power command and the forward controller comprises:
a scheduler for generating a scheduled current signal based on the power command; and
a converter for converting the scheduled current signal to the control instruction signal by multiplying a stoichiometry ratio.

8. The fuel cell system of claim 7, wherein the scheduled current signal generated by the scheduler is based additionally on the power command and a current measurement from the fuel cell stack.

9. The fuel cell system of claim 8, wherein the scheduler comprises:
a current calculation module for calculating a baseline current signal to meet the power command;
a compensation module for generating a compensation current signal based on the current measurement; and
a third summator for summing the baseline current signal and the compensation current signal to generate the scheduled current signal.

10. The fuel cell system of claim 1, wherein the operational constraints of the fuel cell stack are user specified operational constraints associated with the life of the fuel cell stack.

11. The fuel cell system of claim 10, wherein the operational constraints of the fuel cell stack comprise at least one of the following constraints: a voltage of a single fuel cell of the fuel cell stack, a resistance of the fuel cell stack, a pressure difference between anode gas pressure and cathode gas pressure of the fuel cell stack, maximal temperature difference in the fuel cell stack, an oxygen excess ratio which is a ratio of the oxygen supplied to a cathode of the fuel cell stack to the actually consumed oxygen, a fuel excess ratio which is a ratio of the fuel supplied to an anode of the fuel cell stack to the actually consumed fuel, a pressure difference between ambient pressure where the fuel cell system is located and anode inlet gas pressure of the fuel cell stack, a pressure difference between the ambient pressure and cathode inlet gas pressure of the fuel cell stack, cross leakage between the anode and the cathode, cross leakage between the anode and ambient environment where the fuel cell system is located, and cross leakage between the cathode and the ambient environment.

12. The fuel cell system of claim 11, wherein the specific operating limit of the voltage of a single fuel cell of the fuel cell stack is in the range of about 0.55 to 1.0V, the specific operating limit of the pressure difference between the anode gas pressure and the cathode gas pressure of the fuel cell stack is in the range of about −40 Kpa to 40 Kpa, the specific operating limit of the oxygen excess ratio is in the range of 2 to 6, the specific operating limit of the fuel excess ratio is in the range of 1.5 to 6, the specific operating limit of the pressure difference between ambient pressure and the anode inlet gas pressure of the fuel cell stack is in the range of about 0 Kpa to 40 Kpa and the specific operating limit of a pressure difference between the ambient pressure and the cathode inlet gas pressure of the fuel cell stack is in the range of 0 Kpa to 40 Kpa.

13. A method for controlling a fuel cell system, comprising:
generating a control instruction signal based on a command from a load in a fuel cell system, wherein the fuel cell system comprises a fuel cell stack coupled to the load for providing power, and a gas delivery system coupled to the fuel cell stack for providing fuel and oxygen to the fuel cell stack;
predicting whether the control instruction signal will violate operational constraints of the fuel cell stack based on the at least one measured signal;
generating a control correction signal to based on at least one measured signal from the fuel cell system and adding the generated control correction signal to the control instruction signal when it is predicted that the control instruction signal will violate the operational constraints of the fuel cell stack;
generating a control signal based on the control instruction signal and the control correction signal; and
controlling the gas delivery system based on the generated control signal to operate the fuel cell stack within specific operating limits.

14. The method of claim 13, wherein generating the control signal comprises:
summing the control instruction signal and the control correction signal to generate the control signal.

15. The method of claim 13, wherein generating the control correction signal further comprises:
pre-specifying the operational constraints of the fuel cell stack; and
pre-establishing a predictive model that describes behavior of the fuel cell stack.

16. The method of claim 13, wherein the operational constraints of the fuel cell stack comprise at least one of the following constraints: a voltage of a single fuel cell of the fuel cell stack, a resistance of the fuel cell stack, a pressure difference between anode gas pressure and cathode gas pressure of the fuel cell stack, maximal temperature difference in the fuel cell stack, an oxygen excess ratio which is a ratio of the oxygen supplied to a cathode of the fuel cell stack to the actually consumed oxygen, a fuel excess ratio which is a ratio of the fuel supplied to an anode of the fuel cell stack to the actually consumed fuel, a pressure difference between ambient pressure where the fuel cell system is located and anode inlet gas pressure of the fuel cell stack, a pressure difference between the ambient pressure and cathode inlet gas pressure of the fuel cell stack, cross leakage between the anode and the cathode, cross leakage between the anode and ambient environment where the fuel cell system is located, and cross leakage between the cathode and the ambient environment.

17. The method of claim 13, wherein the at least one measured signal comprises at least one of the following signals: an anode inlet gas pressure, an anode outlet gas pressure, a cathode inlet gas pressure, a cathode outlet gas pressure, an anode inlet flow rate, an anode outlet flow rate, a cathode inlet flow rate, and a cathode outlet flow rate of the fuel cell stack, one and more temperature measurements of the fuel cell stack, a voltage of a single fuel cell of the fuel cell stack, a current of the fuel cell stack, and ambient temperature, ambient pressure, and ambient humidity where the fuel cell system is located.

18. The method of claim 13, wherein the command from the load comprises a power command and generating the control instruction signal comprises:
generating a scheduled current signal based on the power command; and
converting the scheduled current signal to the control instruction signal by multiplying a stoichiometry ratio.

19. The method of claim 18, wherein generating the scheduled current signal comprises:
generating the scheduled current signal is further based on the power command and a current measurement from the fuel cell stack.

20. The method of claim 19, wherein generating the scheduled current signal comprises:
calculating a baseline current signal to meet the power command;
generating a compensation current signal based on the current measurement; and
summing the baseline current signal and the compensation current signal to generate the scheduled current signal.

* * * * *